Feb. 7, 1928. 1,658,732
M. W. MOESTA
DOOR CONSTRUCTION
Filed July 27, 1925
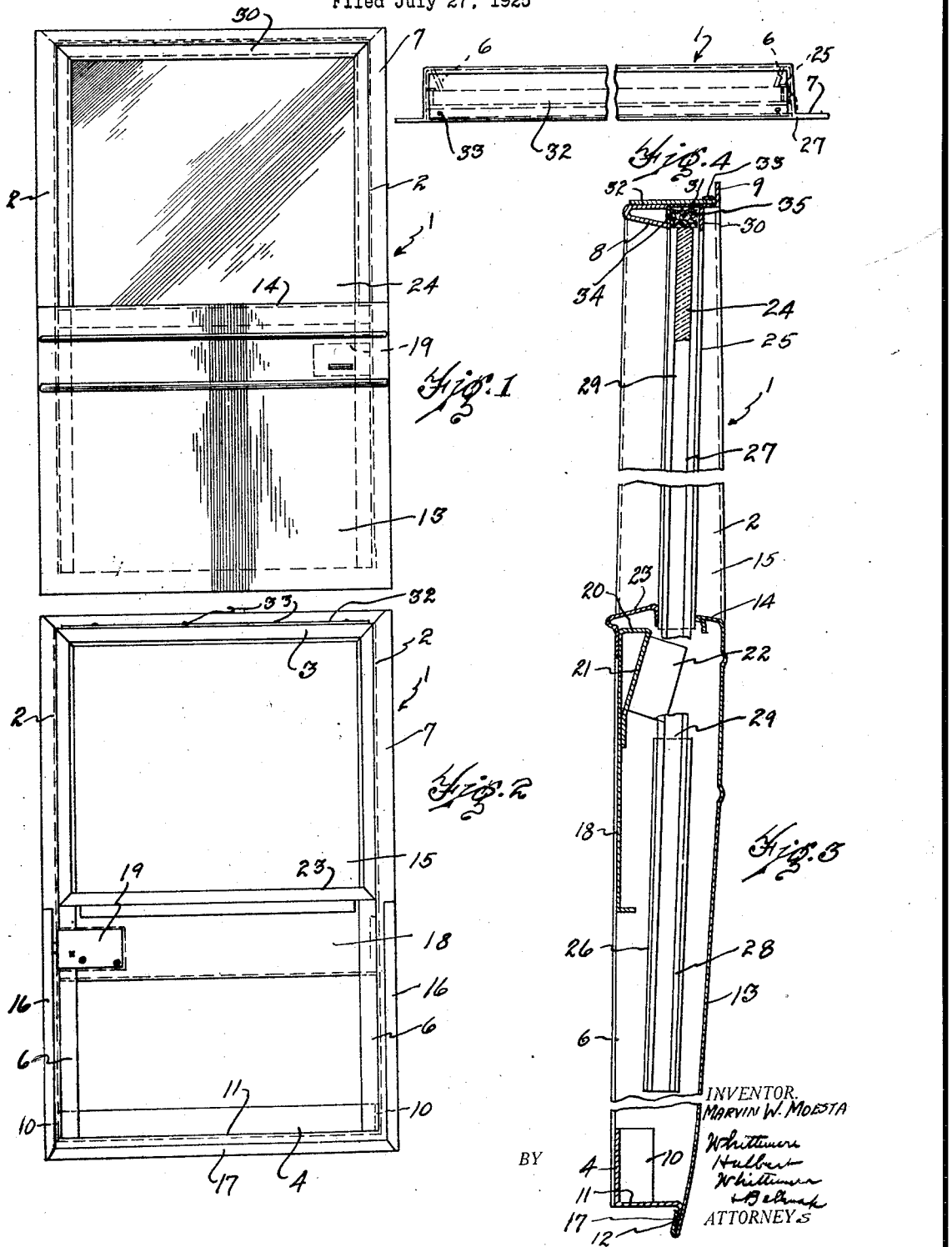

Patented Feb. 7, 1928.

1,658,732

UNITED STATES PATENT OFFICE.

MARVIN W. MOESTA, OF DETROIT, MICHIGAN, ASSIGNOR TO MURRAY BODY CORPORATION, OF DETROIT, MICHIGAN, A CORPORATION OF MICHIGAN.

DOOR CONSTRUCTION.

Application filed July 27, 1925. Serial No. 46,470.

This invention relates generally to door constructions, particularly to all metal door constructions for vehicle bodies and consists of certain novel features of construction, combinations and arrangements of parts as will be more fully described and particularly pointed out in the appended claims.

Referring now to the drawings:

Figure 1 is an elevation of the outer side of the door.

Figure 2 is an elevation of the inner side of the door.

Figure 3 is a vertical sectional view through the door.

Figure 4 is a top plan view of the door.

Referring now to the drawings, the numeral 1 designates a door embodying my invention having a rectangular frame comprising the upright members 2 and cross bar 3 and 4 respectively. As shown, the upright members 2 constitute door pillars and are preferably provided at their inner and outer edges with oppositely extending flanges 6 and 7 respectively. The upper cross bar 3 of the frame constitutes a reinforcing member and is preferably provided at its forward and rear edges with the oppositely extending flanges 8 and 9 respectively. To provide a neat joint, the opposite ends of this cross bar 3 and the upper ends of the pillars 2 are preferably mitred and are welded together as shown in Figure 1 of the drawings. The lower cross bar 4 also constitutes a reinforcing member and is preferably welded at its opposite ends to the flanges 6 of the pillars. To provide a strong connection, this bar 4 is preferably provided at its opposite ends with lateral inwardly extending flanges 10 which are preferably welded to the inner faces of the pillars 2. As shown in Figure 3 of the drawings, this lower cross bar 4 is also preferably provided at its lower edge with a horizontal inwardly extending flange 11 having at its inner edge a depending flange 12 which preferably cooperates with the flanges 7 of the pillars to provide a U-shaped attaching frame for a suitable sheet metal panel 13. As shown, this panel 13 constitutes the exterior finish for the lower half of the door frame and is preferably provided at its upper edge with a return bent flange 14 that projects inwardly between the pillars 2 and constitutes a sill for a window opening 15. The panel 13 may be secured to the door frame in any suitable manner but is preferably provided at its side edges with flanges 16 which are return bent around and welded to the flanges 7 of the pillars and is provided at its lower edge with a flange 17 that is return bent around and welded to the depending flange 12 of the lower cross bar 4.

Located upon the inner side of the door frame, preferably opposite to the upper end of the outer panel 13, is a relatively narrow panel 18 which is preferably welded to the flanges 6 of the pillars. As shown, this panel 18 is adapted to support suitable lock mechanism 19 for the door and is preferably channel-shape in cross section. To provide a strong and durable construction, the upper flange 20 of the channel 18 is preferably provided at its inner edge with a depending apron 21 that is preferably offset slightly at its lower edge and is welded to the inner face of the inner panel 18. If desired, this apron 21 may be provided at its opposite ends with lateral flanges 22 that project inwardly and are preferably welded to the inner sides of the pillars 2. Thus this apron 21 cooperates with the panel 18 and flange 20 to form a transversely extending tube which will take up torsional strains and stresses to which the door may be subjected while in use.

In order that the door will have a neat appearance around the window opening 15, the depending flange 8 of the upper cross bar 3 and the lateral flanges 6 of the pillars are preferably bent inwardly as shown in Figures 3 and 4 respectively of the drawings. Thus these bent flanges 6 and 8 respectively constitute finish strips and cooperate with a separate finish strip 23 secured to the panel 18 to provide a neat window frame.

For closing the window opening 15 I preferably provide a sashless glass panel 24 that is adapted to be moved longitudinally of the door in suitable guides 25 and 26 respectively by suitable control mechanism (not shown). The upper guides 25 preferably extend from the depending flange 8 of the upper cross bar to the upper flange 20 of the inner panel 18 and have the bases 27 thereof welded to the inner faces of the pillars 2, while the lower guides 26 are preferably disposed below the flanges 22 of the apron 21 in alignment with the upper guides 25 and also have their bases 28 welded to the inner faces of the pillars 2. To protect the glass panel 24 and prevent the same from rattling I preferably provide suitable felt strips 29 that extend from the upper end of the upper guides 25 to the lower ends of the lower guides 26.

In order that the glass panel 24 may be easily and quickly inserted into or removed from the guides 25 and 26, a longitudinally extending tongue 30 is preferably pressed inwardly to provide a slot 31 through which the glass panel 24 may be moved. Normally, this slot 31 is closed by a header 32 which is detachably secured to the cross bar 3 by suitable split rivets 33. As shown, this header 32 is preferably a narrow plate that rests upon the upper face of the cross bar 3 and carries an inverted L-shaped strip 34 which cooperates with the depending flange 30 to form a channel for receiving a suitable felt strip 35 against which the upper edge of the glass panel 24 abuts when in raised position.

Thus, from the foregoing description, it will be readily apparent that the door is provided with a full rigid frame that is materially reinforced intermediate its ends by the transversely extending tube. Hence I have provided an exceptionally strong and durable door which is capable of withstanding severe torsional strains and stresses. Inasmuch as the flanges 8 and 6 respectively of the upper cross bar 3 and pillars 2 cooperate with the finish strip 23 to form the window frame, it will also be apparent that the time, labor and expense heretofore used to attach separate finish strips to the door pillars is saved. Hence the cost of manufacturing such doors has been reduced to a minimum.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim as my invention is:

1. In a door, the combination with spaced pillars, of a cross bar secured to said pillars having a longitudinally extending slot, a flange projecting downwardly from the cross bar at an edge of said slot, a header normally closing said slot, and a strip secured to the header normally cooperating with the flange to form a channel.

2. In a door, the combination with spaced pillars, and a window panel movable longitudinally thereof, of channel guides for said window panel secured to said pillars, a cross bar secured to said pillars above said guides having a longitudinally extending slot through which the window panel in said guides may move, and a flange projecting downwardly from an edge of said slot, a header closing said slot, a strip carried by said header cooperating with the flange to form a channel, and a buffer for said window panel carried by said channel.

3. In a door, the combination with spaced pillars, and a window panel movable longitudinally thereof, of channel guides for said window panel secured to said pillars, a cross bar secured to said pillars above said guides having a longitudinally extending slot through which the window panel in said guides may move, said cross bar also having an inwardly depending flange constituting a portion of the window frame of the door, a flange projecting downwardly from an edge of said slot, a header closing said slot, an inverted L-shaped strip carried by said header cooperating with said second mentioned flange to form a channel, and a buffer for said window panel carried by said channel.

4. In a door, the combination with spaced pillars, and a window panel movable longitudinally thereof, of channel guides for said window panel secured to said pillars, a cross bar secured to said pillars above said guides having a longitudinally extending slot through which the window panel in said guides may move, said cross bar having a flange projecting downwardly from an edge of said slot, a header closing said slot, an inverted L-shaped strip carried by said header having one of its legs arranged to extend downwardly from the opposite edge of the slot and cooperating with the flange to form a channel, and a buffer for said window panel carried by said channel.

5. In a door, a cross bar having a longitudinally extending slot through which a window panel may be inserted and having a depending flange at one longitudinal edge of said slot, a header comprising a plate on said cross bar and normally closing said slot, and an inverted substantially L-shaped strip fixed to the lower face of said plate and extending downwardly through said slot, the depending portion of said L being substantially parallel to the depending flange aforesaid and forming a channel for receiving a window panel header strip therebetween.

6. In a door, a frame member provided with a flat inner face and having a return-bent flange at one edge thereof extending inwardly over said flat face and terminating adjacent to the longitudinal median line thereof, and a glass runway mounted on said flat face with an edge thereof substantially meeting the inner edge of said return-bent flange whereby the flat inner face of said frame member from the edge thereof aforesaid to said runway is concealed by said return-bent flange.

In testimony whereof I affix my signature.

MARVIN W. MOESTA.